ис010826560B2

(12) United States Patent
Tsiaflakis et al.

(10) Patent No.: US 10,826,560 B2
(45) Date of Patent: Nov. 3, 2020

(54) TARGETED RECTANGULAR CONDITIONING

(71) Applicant: Alcatel Lucent, Nozay (FR)

(72) Inventors: Paschalis Tsiaflakis, Schriek (BE); Carl Nuzman, Union, NJ (US); Jochen Maes, Antwerp (BE)

(73) Assignee: Nokia of America Corporation, Murray Hill, NJ (US)

( * ) Notice: Subject to any disclaimer, the term of this patent is extended or adjusted under 35 U.S.C. 154(b) by 305 days.

(21) Appl. No.: 15/760,461

(22) PCT Filed: Oct. 3, 2016

(86) PCT No.: PCT/EP2016/073543
§ 371 (c)(1),
(2) Date: Mar. 15, 2018

(87) PCT Pub. No.: WO2017/060186
PCT Pub. Date: Apr. 13, 2017

(65) Prior Publication Data
US 2019/0058502 A1    Feb. 21, 2019

(30) Foreign Application Priority Data
Oct. 6, 2015  (EP) .................................... 15306568

(51) Int. Cl.
*H04B 3/32* (2006.01)
*H04J 11/00* (2006.01)
*H04B 3/487* (2015.01)

(52) U.S. Cl.
CPC ............ *H04B 3/32* (2013.01); *H04J 11/0033* (2013.01); *H04J 11/0046* (2013.01); *H04B 3/487* (2015.01)

(58) Field of Classification Search
CPC ....... H04B 3/32; H04B 3/487; H04J 11/0033; H04J 11/0046; H04L 25/03343
See application file for complete search history.

(56) References Cited

U.S. PATENT DOCUMENTS

| 8,644,127 | B2 | 2/2014 | Biyani et al. |
| 8,891,638 | B2 * | 11/2014 | Pons .................... H04B 17/345 |
| | | | 375/260 |

(Continued)

FOREIGN PATENT DOCUMENTS

| WO | WO-2013/026479 A1 | 2/2013 |
| WO | WO 2013026479 A1 | 2/2013 |

OTHER PUBLICATIONS

International Search Report PCT/ISA/210 for International Application No. PCTEP2016/073543 Dated Oct. 3, 2016.

(Continued)

*Primary Examiner* — Kibrom T Hailu
(74) *Attorney, Agent, or Firm* — Harness, Dickey & Pierce, P.L.C.

(57) ABSTRACT

A vectoring controller for configuring a vectoring processor that jointly processes DMT communication signals to be transmitted over, or received from, a plurality of N subscriber lines according to a vectoring matrix. In accordance with an embodiment, the vectoring controller is configured, for given ones of a plurality of tones, to enable the given tone for direct data communication over a first set of N−Mk targeted lines out of the plurality of N subscriber lines, and to disable the given tone for direct data communication over a second disjoint set of Mk supporting lines out of the plurality of N subscriber lines, Mk denoting a non-null positive integer. The vectoring controller is further configured to configure the vectoring matrix to use an available transmit or receive power at the given tone over the second (Continued)

set of Mk supporting lines for further enhancement of data signal gains at the given tone over the first set of N−Mk targeted lines.

22 Claims, 7 Drawing Sheets

(56) References Cited

U.S. PATENT DOCUMENTS

| | | | | |
|---|---|---|---|---|
| 9,203,471 | B2* | 12/2015 | Luo | H04J 3/10 |
| 9,270,333 | B2* | 2/2016 | Lu | H04B 3/32 |
| 9,379,770 | B2* | 6/2016 | Nuzman | H04B 3/32 |
| 9,407,760 | B2* | 8/2016 | Oksman | H04M 3/2209 |
| 2013/0142319 | A1* | 6/2013 | Lu | H04B 3/32 |
| | | | | 379/93.08 |
| 2014/0105604 | A1* | 4/2014 | Luo | H04B 3/32 |
| | | | | 398/98 |
| 2014/0254704 | A1* | 9/2014 | Ginis | H04B 15/00 |
| | | | | 375/267 |
| 2015/0063560 | A1* | 3/2015 | Nuzman | H04M 11/062 |
| | | | | 379/406.01 |
| 2015/0109970 | A1* | 4/2015 | Sorbara | H04L 5/003 |
| | | | | 370/278 |
| 2015/0124943 | A1* | 5/2015 | Oksman | H04M 3/34 |
| | | | | 379/1.03 |
| 2015/0341180 | A1* | 11/2015 | Rao | H04B 3/32 |
| | | | | 370/201 |
| 2016/0119025 | A1* | 4/2016 | Strobel | H04M 3/007 |
| | | | | 370/201 |

OTHER PUBLICATIONS

Written Opinion of the International Searching Authority PCT/ISA/237 for International Application No. PCTEP2016/073543 Dated Oct. 3, 2016.
Office Action for corresponding Mexican Application No. MX/a/2018/004087 dated Jan. 28, 2020.
Office Action for corresponding Japanese Application No. 2018-517811 dated Apr. 25, 2019 and English translation thereof.
Office Action dated May 26, 2020 in Indian Application No. 201817012021.

* cited by examiner

TARGETED RECTANGULAR CONDITIONING

CROSS-REFERENCE TO RELATED APPLICATIONS

This application is a national phase under 35 U.S.C. § 371 of PCT International Application No. PCT/EP2016/073543 which has an International filing date of Oct. 3, 2016, which claims priority to European Application No. 15306568.5, filed Oct. 6, 2015, the entire contents of each of which are hereby incorporated by reference.

TECHNICAL FIELD OF THE INVENTION

The present invention relates to crosstalk mitigation within a wired communication system.

TECHNICAL BACKGROUND OF THE INVENTION

Crosstalk (or inter-channel interference) is a major source of channel impairment for Multiple Input Multiple Output (MIMO) wired communication systems, such as Digital subscriber Line (DSL) communication systems.

As the demand for higher data rates increases, systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management techniques to multi-user signal coordination (vectoring hereinafter).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal postcoding (or post-processing): the receive data symbols are jointly passed through a postcoder before being detected. The postcoder is such that the concatenation of the communication channels and the postcoder results in little or no inter-channel interference at the detectors. Postcoders are also sometimes referred to as crosstalk cancellation filters.

Signal vectoring is typically performed at a traffic aggregation point as vectoring primarily implies that data symbols concurrently transmitted over, or received from, the vectored lines are bunched and synchronously passed all together through the precoder or postcoder. For instance, signal vectoring is advantageously performed within a Digital subscriber Line Access Multiplexer (DSLAM) deployed at a Central office (co), or as a fiber-fed remote unit closer to subscriber premises (street cabinet, pole cabinet, building cabinet, etc). Such a remote unit may also be referred to as a remote DSLAM, or as a Distribution Point unit (DPu). Signal precoding is particularly appropriate for downstream communication (toward customer premises), while signal postcoding is particularly appropriate for upstream communication (from customer premises).

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line incurring crosstalk from the other communication lines of the group. Crosstalk from lines that do not belong to the vectoring group is treated as alien noise and is not canceled.

Ideally, the vectoring group should match the whole set of communication lines that physically and noticeably interfere with each other. Yet, local loop unbundling on account of national regulation policies and/or limited vectoring capabilities may prevent such an exhaustive approach, in which case the vectoring group would only include a sub-set of the interfering lines, thereby yielding limited vectoring gains.

More formally, an N×N MIMO system can be described by the following linear model:

$$y_k = H_k x_k + z_k \quad (1),$$

wherein the N-component complex vector $x_k$, respectively $y_k$, is a discrete frequency representation, as a function of the frequency/carrier/tone index k, of the symbols transmitted over, respectively received from, the N vectored channels, wherein the N×N complex matrix $H_k$ is the channel matrix: the (i,j)-th component $H_{ij}$ of the channel matrix $H_k$ describes how the communication system produces a signal on the i-th channel output in response to a signal being fed to the j-th channel input; the diagonal elements of the channel matrix describe direct channel coupling, and the off-diagonal elements of the channel matrix (also referred to as the crosstalk coefficients) describe inter-channel coupling, and wherein the N-component complex vector $z_k$ denotes additive noise over the N channels, such as Radio Frequency Interference (RFI) or thermal noise.

Linear signal precoding and postcoding are advantageously implemented by means of matrix products.

In downstream, the linear precoder performs a matrix-product in the frequency domain of a transmit vector $u_k$ with a precoding matrix $P_k$ before actual transmission over the respective subscriber lines, i.e. actual transmit vector is $x_k = P_k u_k$ in eq. (1), the precoding matrix $P_k$ being such that the overall channel matrix $H_k P_k$ is diagonalized, meaning the off-diagonal coefficients of the overall channel and thus the inter-channel interference, mostly reduce to zero.

Practically, and as a first order approximation, the precoder superimposes anti-phase crosstalk pre-compensation signals over the victim line along with the direct signal that destructively interfere at the receiver with the actual crosstalk signals from the respective disturber lines.

In upstream, the linear postcoder performs a matrix-product in the frequency domain of the receive vector $y_k$ with a postcoding matrix $Q_k$ to recover the transmit vector $u_k$ (after channel equalization and power normalization), i.e. detection is performed on $y'_k = Q_k y_k$, the postcoding matrix $Q_k$ being such that the overall channel matrix $Q_k H_k$ is diagonalized, meaning the off-diagonal coefficients of the overall channel $Q_k H_k$, and thus the inter-channel interference, mostly reduce to zero.

The performance of signal vectoring depends critically on the component values of the precoding and postcoding matrix, which component values are to be computed and updated according to the actual and varying channel couplings.

The various channel couplings are estimated by a vectoring controller based on pilot (or probing) signals transmitted over the respective channels. The pilot signals are typically transmitted during dedicated time periods and/or over dedicated tones.

For instance, in the recommendation entitled "self-FEXT Cancellation (Vectoring) For Use with VDSL2 Transceivers", ref. G.993.5 (Vectored VDSL2 hereinafter), and adopted by the International Telecommunication Union (ITU) in April 2010, the transceiver units send pilot signals on the so-called SYNC symbols. The SYNC symbols occur periodically after every super frame, and are transmitted synchronously over all the vectored lines (super frame alignment). A similar technique has been adopted in 6.9701 ITU recommendation (G.fast hereinafter).

On a given disturber line, a subset of the tones of a SYNC symbol (pilot tones hereinafter) are all 4-QAM modulated by the same pilot digit from a given pilot sequence, and transmit one of two complex constellation points, either '1+j' corresponding to '+1' or '−1−j' corresponding to '−1' (vectored VDSL2); or transmit one of three complex constellation points, either '1+j' corresponding to '+1' or '−1−j' corresponding to '−1' or '0+0j' corresponding to '0' (G.fast).

On a given victim line, both the real and imaginary part of the received frequency sample before equalization (G.fast), or of the normalized slicer error, which is the difference vector between the received and properly equalized frequency sample and the constellation point onto which this frequency sample is demapped (vectored VDSL2 and G.fast), are measured on a per pilot tone basis and reported to the vectoring controller for estimation of the various channel couplings.

The successive error samples gathered over a given victim line are next correlated with the pilot sequence used over a given disturber line in order to obtain an estimate of the channel coupling from the given disturber line into the given victim line. To reject the crosstalk contributions from the other disturber lines, the pilot sequences used over the respective disturber lines are mutually orthogonal (e.g., Walsh-Hadamard sequences).

The crosstalk estimates are eventually used for initializing or updating the coefficients of the precoding or postcoding matrix, typically by means of a first or higher-order matrix inversion of the channel matrix (e.g., zero-forcing precoder) or by means of an iterative update (e.g., LMS precoder).

With the advent of new copper access technologies and the use of even broader spectrum up to and beyond 100 MHz, the crosstalk coupling substantially increases. Consequently, the superimposition of the crosstalk precompensation signals on a victim line may cause a violation of the transmit Power spectral Density (PSD) mask, which defines the allowed amount of signal power for an individual user as a function of frequency, and may also result in signal clipping within the Digital to Analog Converter (DAC) causing severe signal distortions.

A first solution is to scale down the gains of the direct signals, and thus of the corresponding precompensation signals, such that the transmit signals, including both the direct and precompensation signals, remain within the allowed transmit power bounds. The PSD reduction is line and frequency dependent, and may change over time, e.g. when a line joins or leaves the vectoring group. The change in direct signal gains must be communicated to the respective receivers for proper channel equalization.

A second solution is the use of Non-Linear Precoding (NLP), which applies modulo arithmetic operation to shift a transmit constellation point with excessive power back within the constellation boundary. At the receiver, the same modulo operation will shift the signal back to its original position. NLP is significantly more computationally complex than linear precoding. For example, NLP typically require matrix decompositions, such as QR matrix decomposition, and numerous alternating linear and non-linear operations.

A further and important consequence of the use of such a broad frequency spectrum is the ill-conditioning of the channel matrix at numerous tones, i.e. the channel matrix is singular or almost singular, and matrix inversion for achieving zero-forcing condition yields large precoder/postcoder coefficients. Thus significant down-scaling needs to be applied to communication signals for linear precoding, resulting in very poor vectoring gains.

Such channel singularities also cause very large fluctuations of the precoder/postcoder coefficients across frequency, meaning that more memory is required to represent the coefficients numerically, which directly translates into higher costs for the vectoring processor.

Last, channel ill-conditioning yields a large distribution of data rates and aggregate transmit power across the subscriber loops. Even with equal loop lengths, we see that the data rate distribution can vary more than 50% from line to line. This is problematic for operators, who are typically interested in delivering common guaranteed data rates (in service classes) to the end-users.

A technique known as tone suppression can circumvent the channel ill-conditioning: if, on a particular tone, the N×N channel matrix of an N-users system is ill-conditioned (i.e., has a large condition number), then one looks for a subset of N-M users such that the corresponding (N−M)×(N−M) reduced channel matrix is well-conditioned (i.e., has a low condition number). The M suppressed lines do not carry any direct communication signal over this tone (i.e., transmit gain and bit loading are both set to zero). An (N−M)×(N−M) precoder/postcoder is then used to cancel the crosstalk between the N−M remaining users. Tone suppression allows the N−M users to still get good data rates at the expense of the M suppressed users. The set of suppressed lines, and the number of suppressed lines M, may be different across tones. By appropriately selecting which lines to suppress on which tone, the overall data rate can be improved relative to a system that uses full N×N inverse precoding/postcoding on every tone.

SUMMARY OF THE INVENTION

It is an object of the present invention to further improve the vectoring gains in the event of the communication channel being ill-conditioned.

In accordance with a first aspect of the invention, a vectoring controller for configuring a vectoring processor that jointly processes Discrete Multi-Tone (DMT) communication signals to be transmitted over, or received from, a plurality of N subscriber lines according to a vectoring matrix is adapted, for given ones of a plurality of tones, to enable the given tone for direct data communication over a first set of N−$M_k$ targeted lines out of the plurality of N subscriber lines, and to disable the given tone for direct data communication over a second disjoint set of $M_k$ supporting lines out of the plurality of N subscriber lines, $M_k$ denoting a non-null positive integer. The vectoring controller is further adapted to configure the vectoring matrix to use an available transmit or receive power at the given tone over the second set of $M_k$ supporting lines for further enhancement of data signal gains at the given tone over the first set of N−$M_k$ targeted lines.

In one embodiment of the invention, the configured vectoring matrix is a rectangular $N \times (N-M_k)$ precoding matrix with at least one non-null off-diagonal precoding coefficient for the respective M matrix rows corresponding to the second set of $M_k$ supporting lines.

In a further embodiment of the invention, the configured rectangular vectoring matrix is a generalized inverse matrix of a $(N-M_k) \times N$ reduced channel matrix comprising far-end coupling coefficients from the plurality of N subscriber lines into the first set of $N-M_k$ targeted lines.

In still a further embodiment of the invention, the generalized inverse matrix is a Moore-Penrose pseudo-inverse of the $(N-M_k) \times N$ reduced channel matrix.

In one embodiment of the invention, the configured vectoring matrix is a rectangular $(N-M_k) \times N$ postcoding matrix with at least one non-null off-diagonal postcoding coefficient for the respective M matrix columns corresponding to the second set of $M_k$ supporting lines.

In a further embodiment of the invention, the configured rectangular vectoring matrix is a generalized inverse matrix of a $N \times (N-M_k)$ reduced channel matrix comprising far-end coupling coefficients from the first set of $N-M_k$ targeted lines into the plurality of N subscriber lines.

In still a further embodiment of the invention, the generalized inverse matrix is a Moore-Penrose pseudo-inverse of the $N \times (N-M_k)$ reduced channel matrix.

In one embodiment of the invention, the vectoring controller is further adapted to determine the first and second sets of lines on a per tone basis.

In one embodiment of the invention, the plurality of tones comprises ill-conditioned tones.

In one embodiment of the invention, the vectoring controller is further adapted to update respective line metrics currently achieved over the plurality of N subscriber lines given the so-enabled and so-disabled tones and the so-configured vectoring matrices while iterating through the plurality of tones, and to determine the first and second sets of lines based on the so-updated line metrics.

In a further embodiment, the vectoring controller is further adapted to assign at least one subscriber line of the plurality of N subscriber lines, whose updated line metric exceeds a given line metric target, to the second set of $M_k$ supporting lines for at least one subsequent tone iteration.

Alternatively, the vectoring controller is further adapted to assign at least one subscriber line of the plurality of N subscriber lines, whose updated line metric exceeds by a given margin at least one updated line metric of at least one further subscriber line of the plurality of N subscriber lines, to the second set of $M_k$ supporting lines for at least one subsequent tone iteration.

The line metrics may refer to respective aggregate data rates and/or aggregate transmit powers achieved so far over the plurality of N subscriber lines given the so-enabled and so-disabled tones and the so configured vectoring matrices.

Such a vectoring controller typically forms part of an access node providing broadband communication services to subscribers over a copper plant and deployed at a co or at a remote location closer to subscriber premises, such as a DSLAM or a DPU.

In accordance with another aspect of the invention, a method for configuring a vectoring processor that jointly processes DMT communication signals to be transmitted over, or received from, a plurality of N subscriber lines according to a vectoring matrix comprises, for given ones of a plurality of tones, enabling the given tone for direct data communication over a first set of $N-M_k$ targeted lines out of the plurality of N subscriber lines, and disabling the given tone for direct data communication over a second disjoint set of $M_k$ supporting lines out of the plurality of N subscriber lines, $M_k$ denoting a non-null positive integer. The method further comprises configuring the vectoring matrix to use an available transmit or receive power at the given tone over the second set of $M_k$ supporting lines for further enhancement of data signal gains at the given tone over the first set of $N-M_k$ targeted lines.

Embodiments of a method according to the invention correspond with the embodiments of a vectoring controller according to the invention.

The present invention proposes to boost the data signal gains at a given tone over $N-M_k$ targeted lines (i.e., targeted for direct data communication) by using the transmit power (precoding) or receive power (postcoding) that has been made available over $M_k$ supporting lines (i.e., supporting data communication to the targeted set) on account of no direct data communication taking place over the $M_k$ supporting lines at that given tone.

In this approach, we improve channel conditioning by eliminating certain rows (precoding) or certain columns (postcoding) of the channel matrix, rather than by eliminating both rows and columns. This results in a rectangular $(N-M_k) \times N$ (precoding) or $N \times (N-M_k)$ (postcoding) reduced channel matrix compared to the known square $(N-M_k) \times (N-M_k)$ reduced channel matrix when the suppressed lines are entirely ignored. Physically, this means that even when the number of users providing data is less than N, namely $N-M_k$, the precoder still generates N output signals that are transmitted on all N vectored lines, and likewise the postcoder still relies on N input signals received from all N vectored lines.

For instance, suppose that we have an ill-conditioned system of N=10 lines that is better conditioned when line 10 is not targeted for direct data communication.

When Precoding the Full System, the Signal Sent on Line 10 uses some of its power budget to send data intended for receiver 10, and some of its budget to cancel crosstalk coming from lines 1 to 9. With the known square tone suppression, no signal at all is sent on line 10. Receiver 10 gets no data, but lines 1 to 9 are relieved from having to use any of their power budget to cancel crosstalk from line 10. With the proposed rectangular conditioning, the full power budget of line 10 is dedicated to sending data intended for lines 1 to 9. Lines 1 to 9 are relieved from having to cancel crosstalk from line 10, and moreover they benefit from this additional transmit power used in their behalf.

When Postcoding the Full System, the Signal Received on line 10 is used to remove, from the received signals on lines 1 to 9, crosstalk originating from line 10. In doing so, some received noise on line 10 is introduced into lines 1 to 9. With the known square tone suppression, no signal is sent on line 10. Receiver 10 gets no data, but lines 1 to 9 are relieved from having to remove crosstalk from line 10, and hence are not affected by noise received on line 10. With the proposed rectangular conditioning, the received signal on line 10, which contains crosstalk signals received from lines 1 to 9, may be applied to aiding the reception of data from lines 1 to 9. Lines 1 to 9 are relieved from having to cancel crosstalk from line 10, and moreover they benefit from additional received power from line 10 used in their behalf.

To take full advantage of this rectangular channel, we use a well-designed rectangular $N \times (N-M_k)$ precoder or $(N-M_k) \times N$ postcoder for coherent combining of the $N-M_k$ data communication signals traveling through the different propagation paths (inc. the direct and indirect propagation paths) at the $N-M_k$ receivers (precoding) or detectors (postcoding) coupled to the N−$M_k$ targeted lines. Owing to this coherent combining, the power of the useful receive signal (i.e., the data signal) is substantially increased over the N−$M_k$ targeted lines before signal detection, and so is their signal to Noise Ratio (SNR) and thus their achievable data rate.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

The square brackets hereinafter surround terms that are deemed to be optional, and thus an expression such as e.g. "the [normalized] channel matrix" shall be construed as either "the channel matrix" or "the normalized channel matrix".

Figure 1:
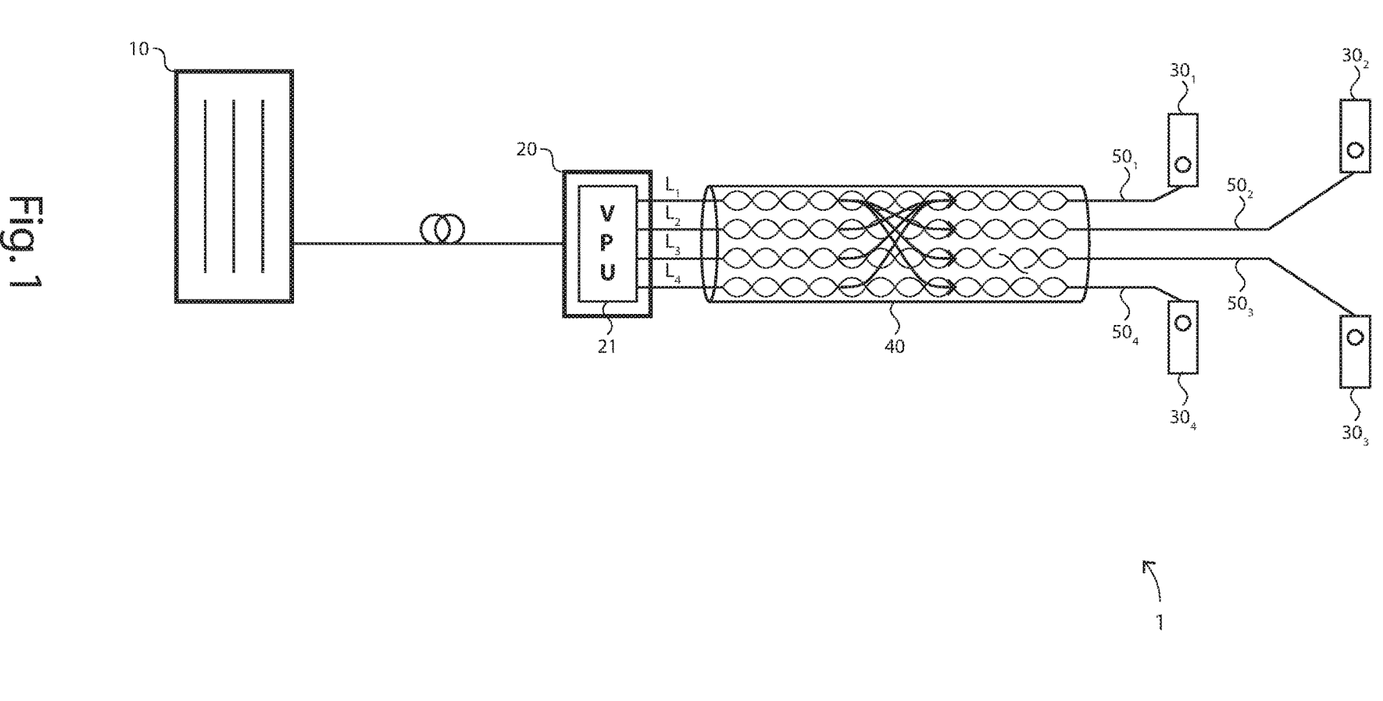
FIG. 1 represents an overview of an access plant.

There is seen in FIG. 1 an access plant 1 comprising a network unit 10 at a co, an access node 20 coupled via one or more optical fibers to the network unit 10, and further coupled via a copper plant to Customer Premises Equipment (CPE) 30 at various subscriber locations. The transmission media of the copper plant is typically composed of copper Unshielded Twisted Pairs (UTP).

As an illustrative example, the copper plant comprises four subscriber lines $L_1$ to $L_4$ sharing a common access segment 40, and then going through dedicated loop segments 50 for final connection to CPEs $30_1$ to $30_4$ respectively.

Within the common access segment 40, the subscriber lines $L_1$ to $L_4$ are in close vicinity and thus induce crosstalk into each other (see the arrows in FIG. 1 between the respective subscriber lines).

The access node 20 comprises a vectoring Processing Unit 21 (or VPU) for jointly processing the data symbols that are being transmitted over, or received from, the copper plant in order to mitigate the crosstalk and to increase the achievable data rates.

Figure 2:
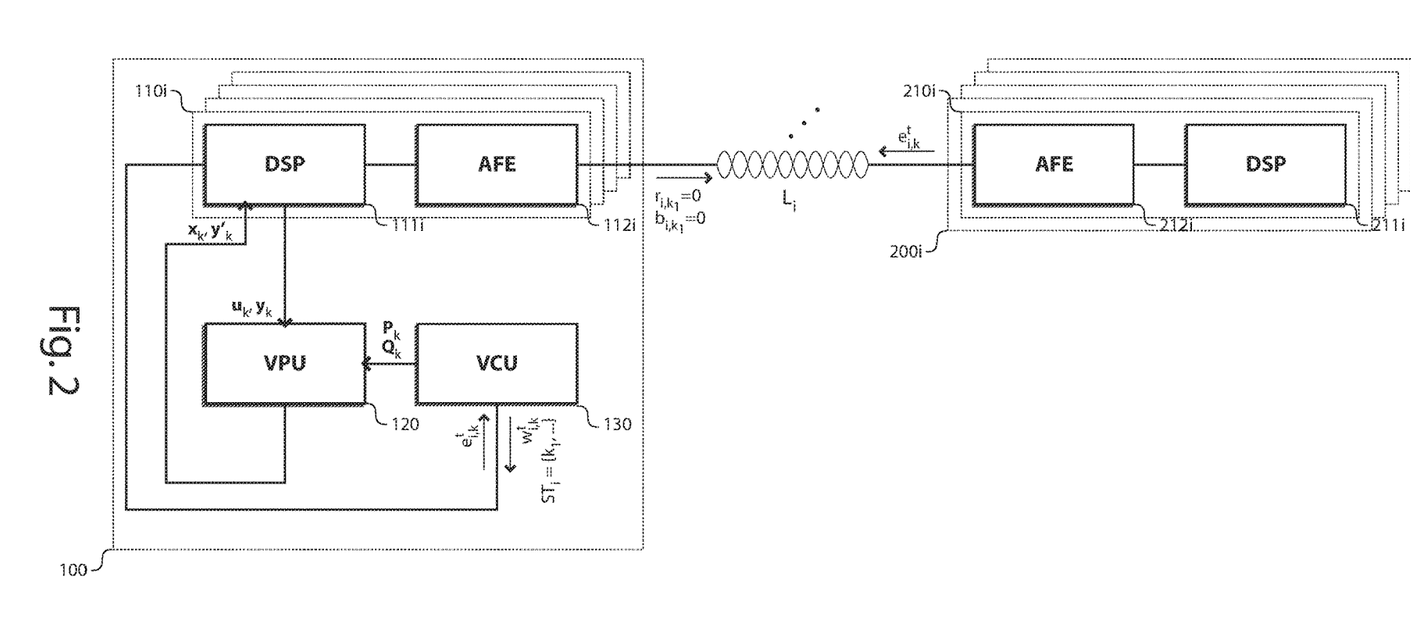
FIG. 2 represents further details about an access node.

There is seen in FIG. 2 further details about an access node 100 and respective CPEs 200.

The access node 100 comprises:
transceivers 110;
a Vectoring Processing Unit (VPU) 120; and
a Vectoring Control Unit (VCU) 130 for controlling the operation of the VPU 120.

The transceivers 110 are individually coupled to the VPU 120 and to the VCU 130. The VCU 130 is further coupled to the VPU 120.

The transceivers 110 individually comprise:
a Digital Signal Processor (DSP) 111; and
an Analog Front End (AFE) 112.

The transceivers 110 are coupled to respective transceivers 210 within the CPEs 200 through respective subscriber lines $L_1$ to $L_N$, which are assumed to form part of the same vectoring group.

The transceivers 210 individually comprise:
a Digital Signal Processor (DSP) 211; and
an Analog Front End (AFE) 212.

The AFEs 112 and 212 individually comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

In case of Frequency Division Duplexing (FDD) operation where downstream and upstream communications operate simultaneously over the same transmission medium in distinct and non-overlapping frequency bands, the AFEs 112 and 212 further comprise a hybrid for coupling the transmitter output to the transmission medium and the transmission medium to the receiver input while achieving low transmitter-receiver coupling ratio. The AFE may further accommodate echo cancellation filters to reduce the coupling ratio at a further extent.

In case of Time Duplexing Division (TDD) operation where downstream and upstream communications operate over the same frequency band but in distinct and non-overlapping time slots, the hybrid can be advantageously omitted as the transmitter and receiver operate in alternate mode: the receive circuitry is switched OFF (or the receive signal is discarded) while the transmit circuitry is active, and the way around, the transmit circuitry is switched OFF while the receive circuitry is active.

The AFEs 112 and 212 further comprise impedance-matching circuitry for adapting to the characteristic impedance of the transmission medium, clipping circuitry for clipping any voltage or current surge occurring over the transmission medium, and isolation circuitry (typically a transformer) for DC-isolating the transceiver from the transmission medium.

The DSPs 111 and 211 are configured to operate downstream and upstream communication channels for conveying user traffic over the subscriber lines $L_1$ to $L_N$.

The DSPs 111 and 211 are further configured to operate downstream and upstream control channels that are used to transport control traffic, such as diagnosis, management or on-Line Reconfiguration (OLR) commands and responses. Control traffic is multiplexed with user traffic over the transmission medium.

More specifically, the DSPs 111 and 211 are for encoding and modulating user and control data into DMT symbols, and for de-modulating and decoding user and control data from DMT symbols.

The following transmit steps are typically performed within the DSPs 111 and 211:
data encoding, such as data multiplexing, framing, scrambling, error correction encoding and interleaving;
signal modulation, comprising the steps of ordering the tones according to a tone ordering table, parsing the encoded bit stream according to the respective bit loadings of the ordered tones, and mapping each chunk of bits onto an appropriate transmit constellation point (with respective carrier amplitude and phase), possibly with Trellis coding;

signal scaling, such as power normalization, transmit PSD shaping and transmit gain scaling;

Inverse Fast Fourier Transform (IFFT);

cyclic Prefix (CP) insertion; and time-windowing.

The following receive steps are typically performed within the DSPs 111 and 211:

time-windowing and CP removal;

Fast Fourier Transform (FFT);

Frequency EQualization (FEQ);

signal de-modulation and detection, comprising the steps of applying to each and every equalized frequency sample an appropriate constellation grid, the pattern of which depends on the respective bit loading, detecting the expected transmit constellation point and the corresponding transmit bit sequence, possibly with Trellis decoding, and re-ordering all the detected chunks of bits according to the tone ordering table; and data decoding, such as data de-interleaving, error correction decoding, de-scrambling, frame delineation and de-multiplexing.

Some of these transmit or receive steps can be omitted, or some additional steps can be present, depending on the exact digital communication technology being used.

The DSPs 111 are further configured to supply transmit frequency samples $u_k$ to the VPU 120 before Inverse Fast Fourier Transform (IFFT) for joint signal precoding, and to supply receive frequency samples $y_k$ to the VPU 120 after Fast Fourier Transform (FFT) for joint signal post-processing.

The DSPs 111 are further configured to receive pre-compensated transmit samples $x_k$ from the VPU 120 for further transmission, and to receive post-compensated receive samples $y'_k$ from the VPU 120 for further detection. Alternatively, the DSPs 111 may receive correction samples to add to the initial frequency samples before further transmission or detection.

The VPU 120 is configured to mitigate the crosstalk induced over the subscriber lines. The VPU 120 comprises a linear precoder configured to multiply a vector $u_k$ of transmit frequency samples with a precoding matrix $P_k$ in order to pre-compensate an estimate of the expected crosstalk, and a linear postcoder configured to multiply a vector of receive frequency samples $y_k$ with a crosstalk cancellation matrix $Q_k$ so as to post-compensate an estimate of the incurred crosstalk.

In the matrix $P_k$ or $Q_k$, a row i is associated with a particular victim line $L_i$, while a column j is associated with a particular disturber line $L_j$.

The VCU 130 is basically for controlling the operation of the VPU 120, and more specifically for estimating the crosstalk coefficients between the subscriber lines of the vectoring group, and for initializing and updating the coefficients of the precoding matrix $P_k$ and of the crosstalk cancellation matrix $Q_k$ from the so-estimated crosstalk coefficients.

The VCU 130 starts first by configuring the transceivers 110 and 210 with the respective pilot sequences to use for modulation of the pilot tones of the pilot symbols (SYNC symbols). The pilot sequences comprises T pilot digits using $\{+1, -1\}$ or $\{+1, 0, -1\}$ as alphabet. The pilot digit that modulates a given tone k during pilot symbol position t over line $L_i$ is denoted as $w_{i,k}^t$. Presently, the pilot symbols are not processed through the VPU 120 as one needs first to characterize the channel matrix per se.

The VCU 130 next gathers measurement samples as measured by the transceivers 110 and 210 while the pilot symbols are being transmitted. The measurement sample as measured by the transceiver 110i or 210i over a victim line $L_i$ at tone k during pilot symbol position t is denoted as $e_{i,k}^t$.

The VCU 130 correlates T measurement samples $\{e_{i,k}^t\}_{t=t_0 \ldots t_0+T-1}$ as measured over a given victim line $L_i$ during a complete acquisition cycle with the T pilot digits $\{w_{j,k}^t\}_{t=t_0 \ldots t_0+T-1}$ of the pilot sequence transmitted over a given disturber line $L_j$ so as to obtain a crosstalk estimate from the disturber line $L_j$ into the victim line $L_i$ at frequency index k. As the pilot sequences are mutually orthogonal, the contributions from the other disturber lines reduce to zero after this correlation step.

The channel matrix and/or the normalized channel matrix are determined based on these correlation results. The nominal channel matrix is derived from a measure of the raw receive signals before equalization, whereas the normalized channel matrix is derived from a measure of the slicer errors after channel equalization.

The so-determined channel matrix may exhibit ill-conditioning at specific tones, that is to say one or more row(s) and/or column(s) of the channel matrix corresponding to one or more subscriber lines can be expressed as, or come close to, a linear combination of the other rows or columns, which makes the channel matrix singular or almost singular, and yields very large vectoring coefficients for zero-forcing vectoring.

Typically, the matrix singularity is quantified by means of a condition number, and a matrix is said to be ill-conditioned when that condition number exceeds some given threshold. For instance, the ratio between the largest and lowest singular values of the channel matrix is a good indicator for ill-conditioning and can be used as condition number.

The VCU 130 is further configured to characterize the ill-conditioning of the so-determined channel matrix at respective tones, and if the channel matrix is characterized as being ill-conditioned at a given tone, then the VCU 130 is further configured to select one or more lines and to disable the given tone for direct data communication over these lines so as the corresponding reduced channel matrix is well-conditioned. The set of lines for which the given tone is kept active for direct data communication is referred to as the targeted set, whereas the set of lines for which the given tone is disabled for direct data communication is referred to as the supporting set.

The VCU 130 distributes targeted and supporting roles to the various subscriber lines $L_1$ to $L_N$ across different tones. Indeed, this is made possible because, when one matrix row or column is [almost] a linear combination of say two other matrix rows or columns, then any of the three subscriber lines corresponding to these three matrix rows or columns can be selected for the supporting set in order to 're-orthogonalize' the channel matrix and make it no longer singular. Owing to the frequency coherence of the channel, the same three lines are likely to be again in the same linear relationship at neighboring tones, and the VCU 130 can select each of these 3 lines in turn. The VCU 130 thus has some degree of freedom for balancing targeted and supporting roles across the lines and achieving some kind of fairness as it will be set forth further in the description.

Also it is noteworthy that, with TDD, the sets of targeted and supporting lines for a given tone can be different in upstream and downstream.

For every line $L_1$, a set of disabled tones $ST_i$ is determined and sent to the respective transceiver 110$i$ (see "$ST_i=\{k_1,\ldots\}$" in FIG. 2), or to a central communication controller that manages the communication parameters of the transceivers 110 and 210. Thereupon, the transceiver 110$i$ configures both the bit loadings $b_{i,k1}$ and transmit gains $r_{i,k1}$ to zero for all tones k in the set $ST_i$. The new bit loading and transmit gain values are communicated to the respective peer transceiver 210$i$ (see "$b_{i,k1}=0$" and "$r_{i,k1}=0$" in FIG. 2).

It is noteworthy that pilot signals keep on being transmitted over these disabled tones notwithstanding their transmit gain and bit loading, which have been both set to zero. By so doing, the full [normalized] channel matrix can still be estimated on every tone.

Let k be such an ill-conditioned tone: direct data communication at tone k is to be disabled over one or more subscriber lines in order to obtain a well-conditioned reduced channel matrix at tone k.

Let $L=\{L_1, \ldots, L_N\}$ denote the set of all vectored lines. Let $A_k$ denote the set of targeted lines at tone k, that is to say the set of lines for which tone k is kept enabled for direct data communication (i.e., corresponding bit loading and transmit gain are both different from zero), and let $B_k$ denote the set of supporting lines at tone k, that is to say the set of lines for which tone k is disabled for direct data communication (i.e., corresponding bit loading and transmit gain are both set to zero).

We have:

$$L = A_k \cup B_k \text{ and } A_k \cap B_k = \emptyset \quad (2).$$

Let $M_k$ denote the size of the set $B_k$, implying that $N-M_k$ is the size of the set $A_k$ on account of the set equations (2). The number $M_k$ of lines that need to be removed from the targeted set is mostly determined by the condition of the [normalized] channel matrix at respective tones, but may also depend on further criteria.

Let $H_k$ denote the N×N [normalized] channel matrix at tone k, and let us arrange the [normalized] channel matrix as $$H_k = \begin{bmatrix} H_{Ak} \\ H_{Bk} \end{bmatrix},$$

wherein $H_{Ak}$ denotes a reduced $(N-M_k) \times N$ [normalized] channel matrix comprising the $N-M_k$ rows of the [normalized] channel matrix $H_k$ corresponding to the set of targeted lines $A_k$ and all N columns, and $H_{Bk}$ denotes a reduced $M_k \times N$ [normalized] channel matrix comprising the $M_k$ rows of the [normalized] channel matrix $H_k$ corresponding to the set of supporting lines $B_k$ and all N columns. In other words, the rows of the [normalized] channel matrix $H_k$ have been re-arranged for the supporting lines $B_k$ to occupy the last $M_k$ rows. This rearrangement of rows and columns is to simplify the notation for exposition, and is not necessary in practice as should be clear to those skilled in the art.

Let $P_k=[P_{Ak}\ P_{Bk}]$ denote the precoding matrix used at tone k, with $P_{Ak}$ denoting a reduced $N \times (N-M_k)$ precoding matrix comprising the $N-M_k$ columns of the precoding matrix $P_k$ corresponding to the set of targeted lines $A_k$ and all N rows, and $P_{Bk}$ denoting a reduced $N \times M_k$ precoding matrix comprising the $M_k$ columns of the precoding matrix $P_k$ corresponding to the set of supporting lines $B_k$ and all N rows.

With Zero-Forcing Precoding and when Targeting all lines, we would have $P_k = H_k^{-1}$.

$$\begin{bmatrix} 0 & S_{Bk} \end{bmatrix}$$

be the transmit gain scaling diagonal matrix at tone k for conformance to a transmit PSD mask and total aggregate power, with $S_{Ak}$ and $S_{Bk}$ being the diagonal matrices corresponding to the set of targeted lines $A_k$ and the set of supporting lines $B_k$ respectively. The diagonal coefficients of the diagonal matrix $S_{Bk}$ are set to zero as there are no data communication signals transmitted over the supporting lines Bk at tone k.

With this notation in mind, the VCU 130 is further configured, for respective ones of the ill-configured tones used for downstream communication:

to determine a set $A_k$ of targeted lines and a corresponding set $B_k$ of supporting lines to obtain a well-conditioned reduced [normalized] channel matrix $H_{Ak}$; and to compute or recompute a rectangular precoding matrix $\tilde{P}_{Ak}$ for the targeted lines $A_k$ for which the following three conditions hold:

a) The rows of $\tilde{P}_{Ak}$ corresponding to the supporting lines $B_k$ are not forced to zero, and thus precompensation signals are transmitted over the supporting lines $B_k$.

b) The rows of $\tilde{P}_{Ak}$ corresponding to the targeted lines $A_k$ are not the same as the corresponding rows of the full precoding matrix $P_k$ (i.e., when all lines are targeted). This emphasizes that one does not just take the rows of the inverse of the full [normalized] channel matrix $P_k = H_k^{-1}$.

c) The (re)computed vectoring matrix $\tilde{P}_{Ak}$ has a zero-forcing design and diagonalizes the overall channel over the targeted lines $A_k$:

$$\begin{bmatrix} H_{Ak}\tilde{P}_{Ak}S_{Ak} & H_{Ak}\tilde{P}_{Bk}S_{Bk} \\ H_{Bk}\tilde{P}_{Ak}S_{Ak} & H_{Bk}\tilde{P}_{Bk}S_{Bk} \end{bmatrix} = \begin{bmatrix} H_{Ak}\tilde{P}_{Ak}S_{Ak} & 0 \\ H_{Bk}\tilde{P}_{Ak}S_{Ak} & 0 \end{bmatrix} = \begin{bmatrix} D_{Ak} & 0 \\ X & 0 \end{bmatrix}, \quad (3)$$

with $D_{Ak}$ denoting a diagonal matrix, and x denoting a 'don't care'. The coefficients of the precoding matrix $\tilde{P}_{Bk}$ are made irrelevant by setting all gains of the diagonal matrix $s_{Bk}$ to zero. These coefficients can be left unchanged, or can be reset to zero too.

One possible concrete precoder computation is to use the Moore-Penrose pseudo-inverse of the reduced [normalized] channel matrix $H_{Ak}$ as follows:

$$\tilde{P}_{Ak} = H_{Ak}^H (H_{Ak} H_{Ak}^H)^{-1} \quad (4).$$

However, this is not the only choice, but a whole family of generalized inverses can serve as precoder. For instance, the following generalized inverse could be used as zero-forcing precoder too:

$$\tilde{P}_{Ak} = W H_{Ak}^H (H_{Ak} W H_{Ak}^H)^{-1} \quad (5),$$

wherein w denotes a N×N diagonal matrix with real diagonal coefficients.

In general, an $N \times (N-M_k)$ precoder has $N(N-M_k)$ degrees of freedom, of which $(N-M_k)^2$ should be used to ensure that all crosstalk is canceled ($D_A$ is diagonal), and the remaining $(N-M_k)M_k$ degrees of freedom are available to try to maximize the power of the receive communication signals on the $N-M_k$ targeted lines, that is to say to make diagonal values of the diagonal matrix $D_{Ak}$ as large as possible while meeting the various power constraints.

A few words regarding the use of the channel matrix or the normalized channel matrix for the computation of the precoding matrix.

The channel matrix and the normalized channel matrix only differ by left-multiplication with a diagonal matrix $F_k$ comprising the inverses of the diagonal elements of $H_k$:

$$G_k = F_k H_k \quad (5),$$

wherein $H_k$ and $G_k$ denote the now-differentiated channel matrix and normalized channel matrix respectively.

By virtue of eq. (4) or (5), the corresponding precoding matrices will only differ by right-multiplication with a diagonal matrix:

$$\tilde{P}_{Ak} = G_{Ak}^H (G_{Ak} G_{Ak}^H)^{-1} \quad (6)$$
$$= (F_{Ak} H_{Ak})^H ((F_{Ak} H_{Ak})(F_{Ak} H_{Ak})^H)^{-1} = H_{Ak}^H F_{Ak}^H (F_{Ak} H_{Ak} H_{Ak}^H F_{Ak}^H)^{-1}$$
$$= H_{Ak}^H F_{Ak}^H F_{Ak}^{H-1} (F_{Ak} H_{Ak} H_{Ak}^H)^{-1} = H_{Ak}^H (H_{Ak} H_{Ak}^H)^{-1} F_{Ak}^{-1},$$

wherein the normalized channel matrix $G_k$ has been decomposed into $G_{Ak}$ and $G_{Bk}$ as per the channel matrix $H_k$, and wherein $F_{Ak}$ denotes a diagonal matrix comprising the diagonal coefficients of the diagonal matrix $F_k$ corresponding to the N–$M_k$ targeted lines.

Some power normalization is however required at transmit side through pre-multiplication with the scaling matrix $S_{Ak}$ in order to achieve the required transmit power, and thus the use of the nominal or normalized channel matrix for the computation of the precoding matrix will eventually yield the same effective precoding matrix.

Figure 3:
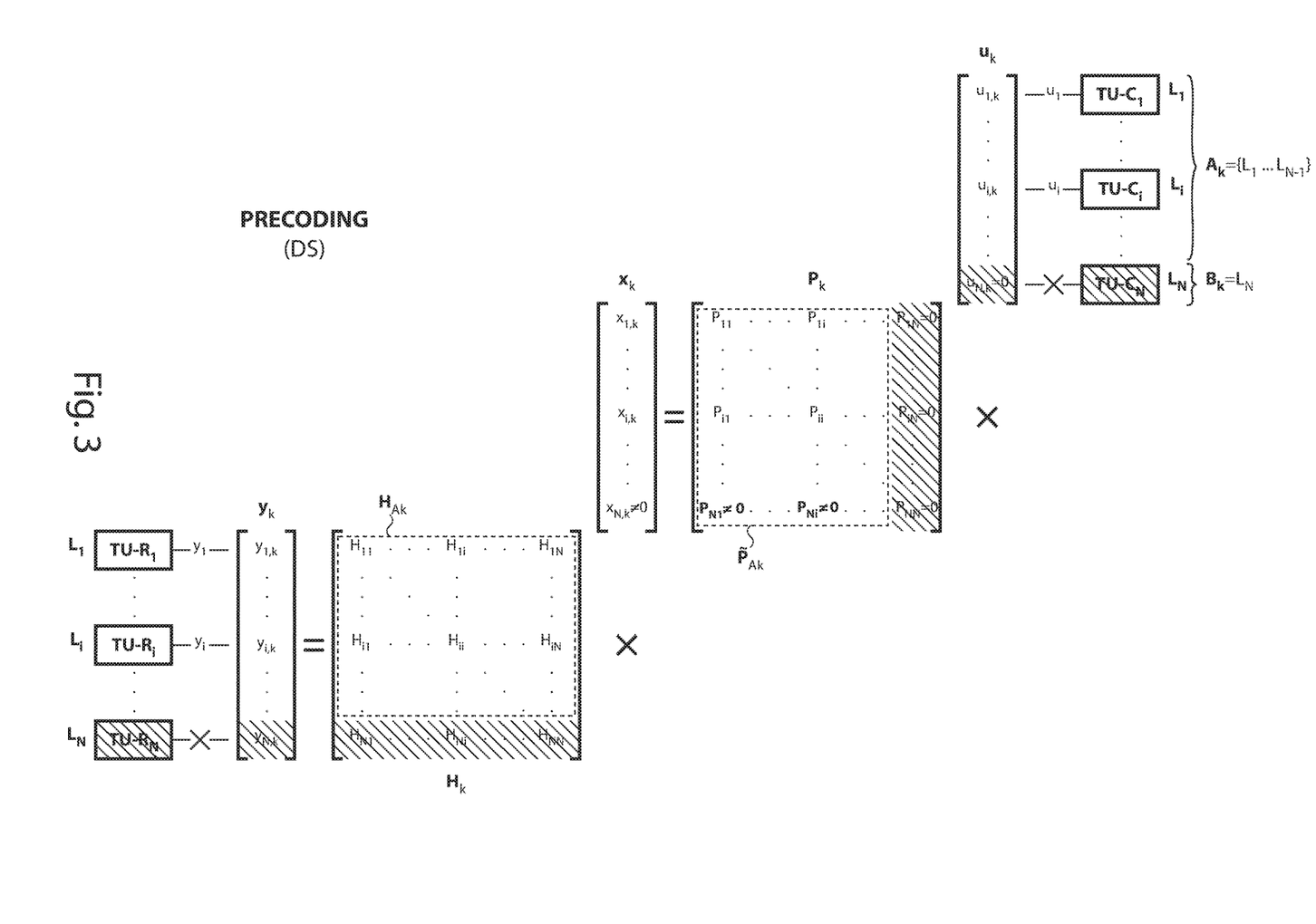
FIG. 3 represents an overview of rectangular precoding as per the present invention.

Rectangular precoding is illustrated in FIG. 3.

N transceivers TU-$C_1$ to TU-$C_N$ at network side supplies a downstream transmit vector $u_k$ for every transmit DMT symbol period for further precoding, transmission, reception and detection by N respective transceivers TU-$R_1$ to TU-$R_N$ at subscriber side. The transmit vector $u_k$, comprising respective transmit frequency samples $u_{1,k}$ to $u_{N,k}$ after constellation mapping and scaling, is input to a precoder with precoding matrix $P_k$ to yield a precoded signal $x_k = [x_{1,k} \ldots x_{N,k}]^T = P_k u_k$ for further transmission over the respective subscriber lines $L_1$ to $L_N$.

Let us assume for convenience that, at tone k, one line is being moved from the targeted set $A_k$ to the supporting set $B_k$ (i.e., $M_k=1$) in order to obtain a well-conditioned reduced channel matrix, and let us further assume that this supporting line is line $L_N$. Thus no downstream data is conveyed over line $L_N$ at tone k, or equivalently $u_{N,k}=0$ (see crosshatched area in transmit vector $u_k$), and corresponding transmit gain and bit loading are both set to zero. As a consequence, the corresponding $N^{th}$ column of the precoding matrix $P_k$ is irrelevant as it does not play any role in signal precoding (see crosshatched area in precoding matrix $P_k$). The corresponding precoding coefficients $P_{1N}$ to $P_{NN}$ are preferably (but not necessarily) set to zero.

Yet, one or more off-diagonal coefficients of the $N^{th}$ row of the precoding matrix $P_k$ are set to a value different from 0 (see boldened coefficients in precoding matrix $P_k$), meaning that crosstalk precompensation signals keep on being transmitted over line $L_N$ at tone k despite tone k being disabled for direct data communication over line $L_N$ (i.e., $x_{N,k} \neq 0$ despite $u_{N,k}=0$). The effective precoding matrix has thus a rectangular shape.

Next, the precoded vector $x_k$ goes through the channel matrix $H_k$, thereby yielding the receive vector $y_k = [y_{1,k} \ldots y_{N,k}]^T$ for reception and detection by the transceivers TU-$R_1$ to TU-$R_N$. As no communication takes place over tone k for line $L_N$, the transceiver TU-$R_N$ discards the receive frequency sample $y_{N,k}$ and the corresponding $N^{th}$ row of the channel matrix $H_k$ is irrelevant (see crosshatched area in channel matrix $H_k$ and vector $y_k$).

A new rectangular N×(N−1) precoding matrix $\tilde{P}_{Ak}$ is computed and enforced into the columns of the precoding matrix $P_k$ corresponding to the targeted lines $A_k$. The new rectangular precoding matrix $\tilde{P}_{Ak}$ makes an opportunistic use of the available transmit power over the supporting line $L_N$ (on account of no data communication signal being sent on that line) for insertion over that line of appropriately scaled and rotated replicas of the N−1 communication signals $u_{i,i\neq N}$ (or a part thereof), and further for coherent combining of these N−1 communication signals $u_{i,i\neq N}$ traveling over the various propagation paths at the transceivers TU-$R_{i,i\neq N}$, which then undergo a substantial increase of their receive signal power compared to full precoding (all lines being targeted with considerable signal down-scaling) or square tone suppression (one or more lines being suppressed without any signal transmission over the suppressed lines).

The data signal gain $\alpha_{i,k}$ over line $L_1$ at tone k is given by:

$$\alpha_{i,k} = \sum_{j=1}^{N} H_{ij,k} P_{ji,k}, \quad (7)$$

and now comprises an additional term $H_{iN,k} P_{Ni,k}$ on account of the rectangular conditioning. This term will reinforce the power (or magnitude) of the useful signal $u_{i,k}$ provided the precoding coefficient $P_{Ni,k}$ is appropriately chosen.

The postcoding use case is very similar to the precoding use case.

Let us arrange the N×N [normalized] channel matrix as $H_k = [H_{Ak} H_{Bk}]$ wherein $H_{Ak}$ now denotes a reduced N×(N−$M_k$) [normalized] channel matrix comprising the N−$M_k$ columns of the [normalized] channel matrix $H_k$ corresponding to the set of targeted lines $A_k$ and all N rows, and $H_{Bk}$ now denotes a reduced N×$M_k$ [normalized] channel matrix comprising the $M_k$ columns of the [normalized] channel matrix $H_k$ corresponding to the set of supporting lines $B_k$ and all N rows. In other words, the columns of the [normalized] channel matrix $H_k$ have been re-arranged for the supporting lines $B_k$ to occupy the last $M_k$ columns.

Let $$Q = \begin{bmatrix} Q_{Ak} \\ Q_{Bk} \end{bmatrix}$$

denote the postcoding matrix used at tone k, with $Q_{Ak}$ denoting a reduced (N−$M_k$)×N postcoding matrix comprising the N−$M_k$ rows of the postcoding matrix $Q_k$ corresponding to the set of targeted lines $A_k$ and all N columns, and $Q_{Bk}$ denoting a reduced $M_k$×N postcoding matrix comprising the $M_k$ rows of the postcoding matrix $Q_k$ corresponding to the set of supporting lines $B_k$ and all N columns.

With zero-forcing postcoding and when all lines are targeted, we would still have $Q_k = H_k^{-1}$.

$$[0 \ S_{Bk}]$$

still denotes the transmit gain scaling matrix. The diagonal coefficients of the diagonal matrix $S_{Bk}$ are set to zero as there are no communication signals transmitted over the supporting lines $B_k$ at tone k.

The VCU 130 is further configured, for respective ones of the ill-configured tones used for upstream communication:

to determine a set $A_k$ of targeted lines and a corresponding set $B_k$ of supporting lines to obtain a well-conditioned reduced [normalized] channel matrix $H_{Ak}$; and to compute or recompute a rectangular postcoding matrix $\tilde{Q}_{Ak}$ for the targeted active lines $A_k$ for which the following three conditions hold:

a) The columns of $\tilde{Q}_{Ak}$ corresponding to the supporting lines $B_k$ are not forced to zero, and thus the signals that leak into the supporting lines $B_k$ are exploited for further enhancement of the data signal gains over the targeted lines $A_k$.

b) The columns of $\tilde{Q}_{Ak}$ corresponding to the targeted lines $A_k$ are not the same as the corresponding columns of the full postcoding matrix $Q_k$ (i.e., when all lines are targeted). This emphasizes that one does not just take the columns of the full matrix inverse $Q_k = H_k^{-1}$.

c) The (re)computed vectoring matrix $\tilde{Q}_{Ak}$ has a zero-forcing design and diagonalizes the overall channel over the targeted lines $A_k$:

$$\begin{bmatrix} \tilde{Q}_{Ak} H_k S_k \\ \tilde{Q}_{Bk} H_{Ak} S_{Ak} \end{bmatrix} \begin{bmatrix} \tilde{Q}_{Ak} H_k S_k \\ \tilde{Q}_{Bk} H_{Bk} S_{Bk} \end{bmatrix} = \qquad (8)$$

$$\begin{bmatrix} \tilde{Q}_{Ak} H_{Ak} S_{Ak} & 0 \\ \tilde{Q}_{Bk} H_{Ak} S_{Ak} & 0 \end{bmatrix} = \begin{bmatrix} D_{Ak} & 0 \\ X & 0 \end{bmatrix},$$

with $D_{Ak}$ denoting a diagonal matrix. The coefficients of the postcoding matrix $\tilde{Q}_{Bk}$ are irrelevant because the supporting lines $B_k$ are not used for direct data communication. These coefficients can be left unchanged, or can be reset to zero.

One possible concrete postcoder computation is to use the Moore-Penrose pseudo-inverse for the reduced channel $H_{Ak}$ as follows:

$$\tilde{Q}_{Ak} = (H_{Ak}^H H_{Ak})^{-1} H_{Ak}^H \qquad (9).$$

Other generalized inverses can serve as postcoder too, such as:

$$\tilde{Q}_{Ak} = (H_{Ak}^H W H_{Ak})^{-1} H_{Ak}^H W \qquad (10).$$

wherein w denotes a N×N diagonal matrix with real diagonal coefficients.

The same reasoning applies regarding the indistinct use of the channel matrix or normalized channel matrix for the computation of the postcoding matrix as per eq. (9) or (10): the corresponding postcoding matrices will now only differ by left-multiplication with a diagonal matrix, which diagonal matrix being anyhow compensated for by frequency equalization at the receivers, which will re-normalize the power of the receive samples before detection.

Figure 4:
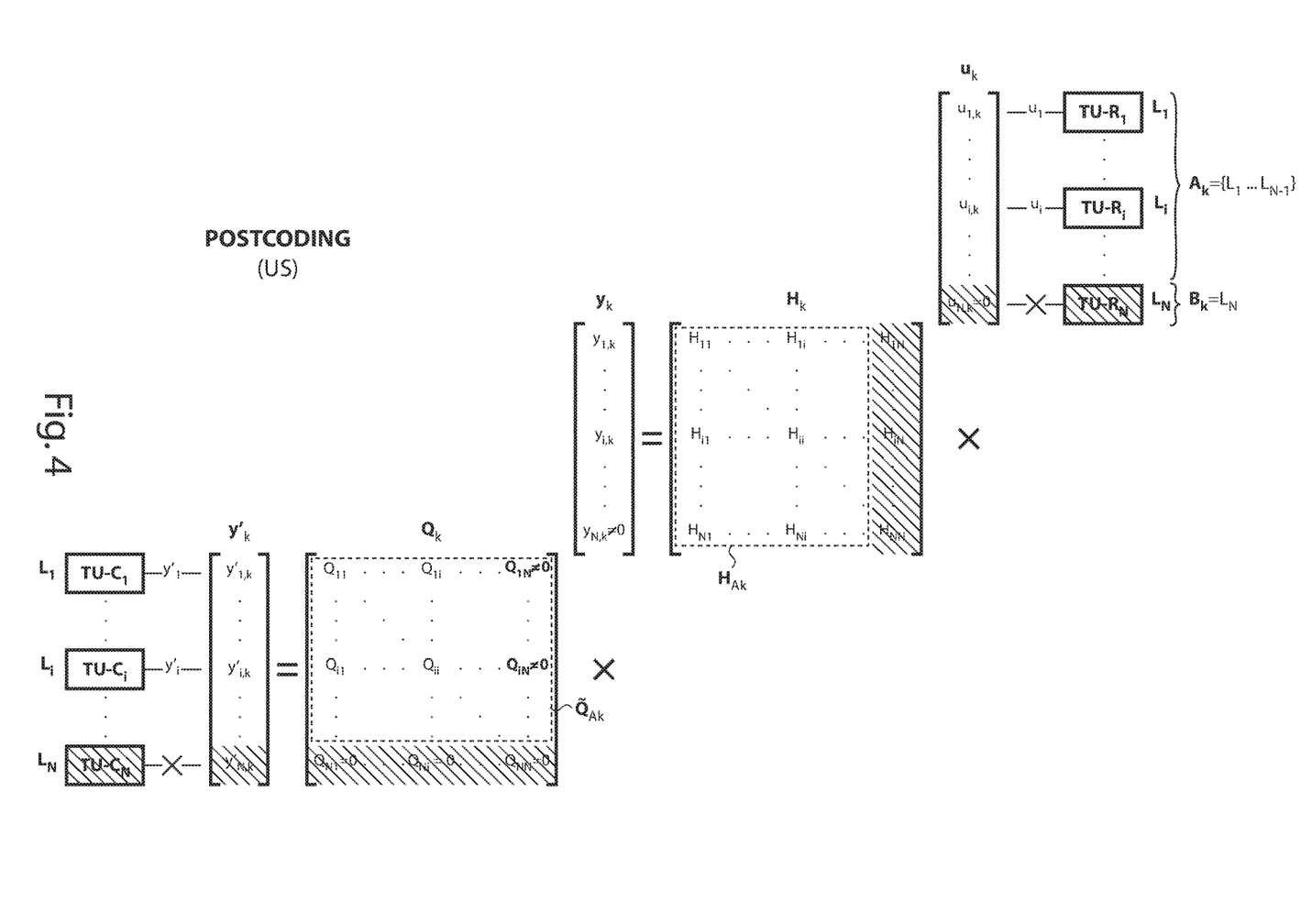
FIG. 4 represents an overview of rectangular postcoding as per the present invention.

Rectangular postcoding is illustrated in FIG. 4.

N transceivers TU-R$_1$ to TU-R$_N$ at subscriber side transmit respective transmit frequency samples $u_{1,k}$ to $u_{N,k}$ over the respective subscriber lines $L_1$ to $L_N$ for further transmission, reception, postcoding and detection by N respective transceivers TU-C$_1$ to TU-C$_N$ at network side. These transmit samples form a transmit vector $u_k = [u_{1,k} \ldots u_{N,k}]^T$.

Let us again assume for convenience that, at tone k, one line is being moved from the targeted set $A_k$ to the supporting set $B_k$ (i.e., $M_k = 1$) in order to obtain a well-conditioned reduced channel matrix, and let us again further assume that this supporting line is line $L_N$. Thus no upstream data is conveyed over line $L_N$ at tone k, or equivalently $u_{N,k} = 0$ (see crosshatched area in transmit vector $u_k$), and corresponding transmit gain and bit loading are both set to zero. As a consequence, the corresponding $N^{th}$ column of the channel matrix $H_k$ is irrelevant (see crosshatched area in channel matrix $H_k$).

The receive vector $y_k = [y_{1,k} \ldots y_{N,k}]^T = H_k u_k$ goes through the postcoding matrix $Q_k$ to yield the postcoded vector $y'_k = [y'_{1,k} \ldots y'_{N,k}]^T = Q_k y_k$. One or more off-diagonal coefficients of the $N^{th}$ column of the postcoding matrix $Q_k$ are set to a value different from 0 (see boldened coefficients in postcoding matrix $Q_k$), meaning that the signal received from the supporting line $L_N$, which comprises all crosstalk signals from lines $L_1$ to $L_{N-1}$ that have leaked into line $L_N$, keep on being processed at tone k for further enhancement of the data signal gains over lines $L_1$ to $L_{N-1}$. The effective postcoding matrix has thus a rectangular shape.

A new rectangular (N−1)×N postcoding matrix $\tilde{Q}_{Ak}$ is computed and enforced into the rows of the postcoding matrix $Q_k$ corresponding to the targeted lines. The new rectangular postcoding matrix $\tilde{Q}_{Ak}$ makes an opportunistic use of the available receive power over the supporting line $L_N$ (on account of no data communication signal being sent on that line) by appropriately scaling and rotating the N−1 crosstalk signals $H_{Ni} u_{i, i \neq N}$ (or a part thereof), and further for coherent combining of these N−1 crosstalk signals $H_{Ni} u_{i, i \neq N}$ at the transceivers TU-C$_{i, i \neq N}$, which then undergo a substantial increase of the SNR before detection compared to full postcoding (when all lines are targeted but with considerable increase of the noise power because of the channel ill-conditioning) or square tone suppression (one or more lines being suppressed without any receive signal from the suppressed lines being exploited).

The data signal gain $\alpha_{i,k}$ over line $L_i$ at tone k is given by:

$$\alpha_{i,k} = \sum_{j=1}^{N} Q_{ij,k} H_{ji,k}, \qquad (11)$$

and now comprises an additional term $Q_{iN,k} H_{Ni,k}$ on account of the rectangular conditioning. This term will reinforce the strength of the data signal $u_{i,k}$ provided the postcoding coefficient $Q_{iN,k}$ is appropriately chosen.

As no communication takes place over tone k for line $L_N$ (see crosshatched area in vector $y'_k$), the transceiver TU-C$_N$ discards the receive frequency sample $y'_{N,k}$ and the corresponding $N^{th}$ row of the postcoding matrix $Q_k$ is irrelevant (see crosshatched area in postcoding matrix $Q_k$).

Figure 6A:
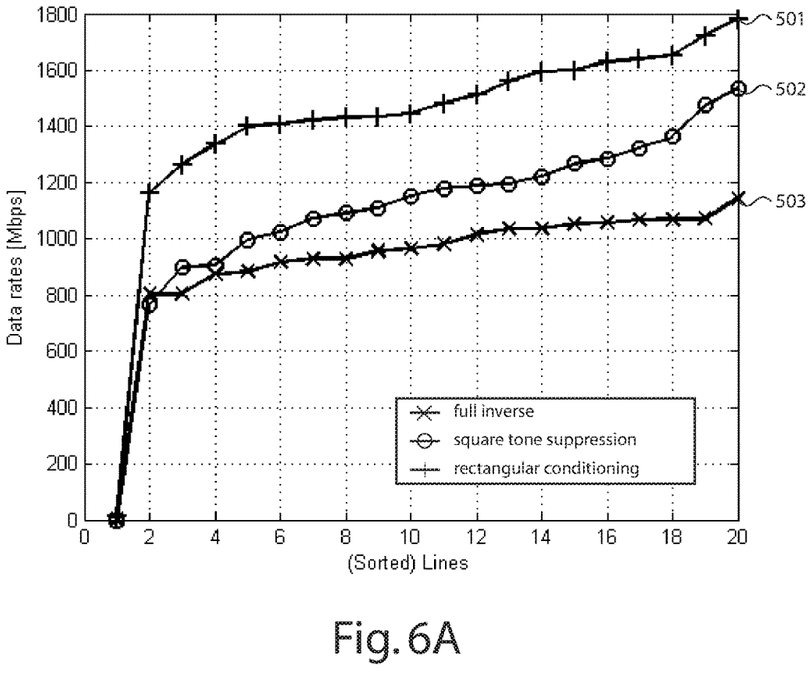
FIGS. 6A, 6B and 6C represent various performance plots for rectangular conditioning versus known techniques (full inverse and square tone suppression).
Figure 6B:
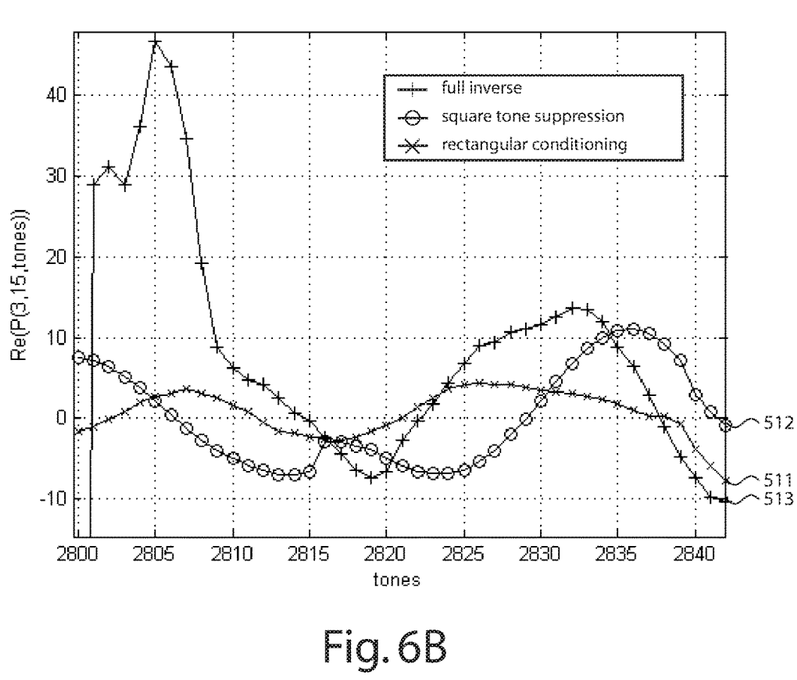

The performance of the proposed rectangular conditioning versus known vectoring schemes are illustrated on FIGS. 6A and 6B.

FIG. 6A represents a comparison of the achievable data rates with precoding based on the proposed rectangular conditioning (plot 501) versus precoding based on square tone suppression (plot 502) and precoding based on full channel inverse when all lines in the system are targeted (plot 503). Presently, the vectoring group comprises 48 lines. The lines are sorted according to their respective data rates, and the data rates achieved with the respective precoding schemes are plotted for the first 20 lines. As one can see, rectangular precoding clearly outperforms the other two precoding schemes.

In FIG. 6B, the real part of a precoding coefficient has been plotted versus frequency for the three considered precoding schemes. Again, the frequency coherence for rectangular conditioning (plot 511) is clearly higher than for square tone suppression (plot 512) and full channel inverse (plot 513). The smoother variation of the precoder coefficients across frequency makes them easier to compress, resulting in lower cost hardware.

It is to be noticed that the proposed rectangular conditioning does not need to be restricted to ill-conditioned tones only, but can further be used at tones for which the full channel matrix is well-conditioned, for instance in order to improve data rates over targeted bad-performing lines.

Figure 5:
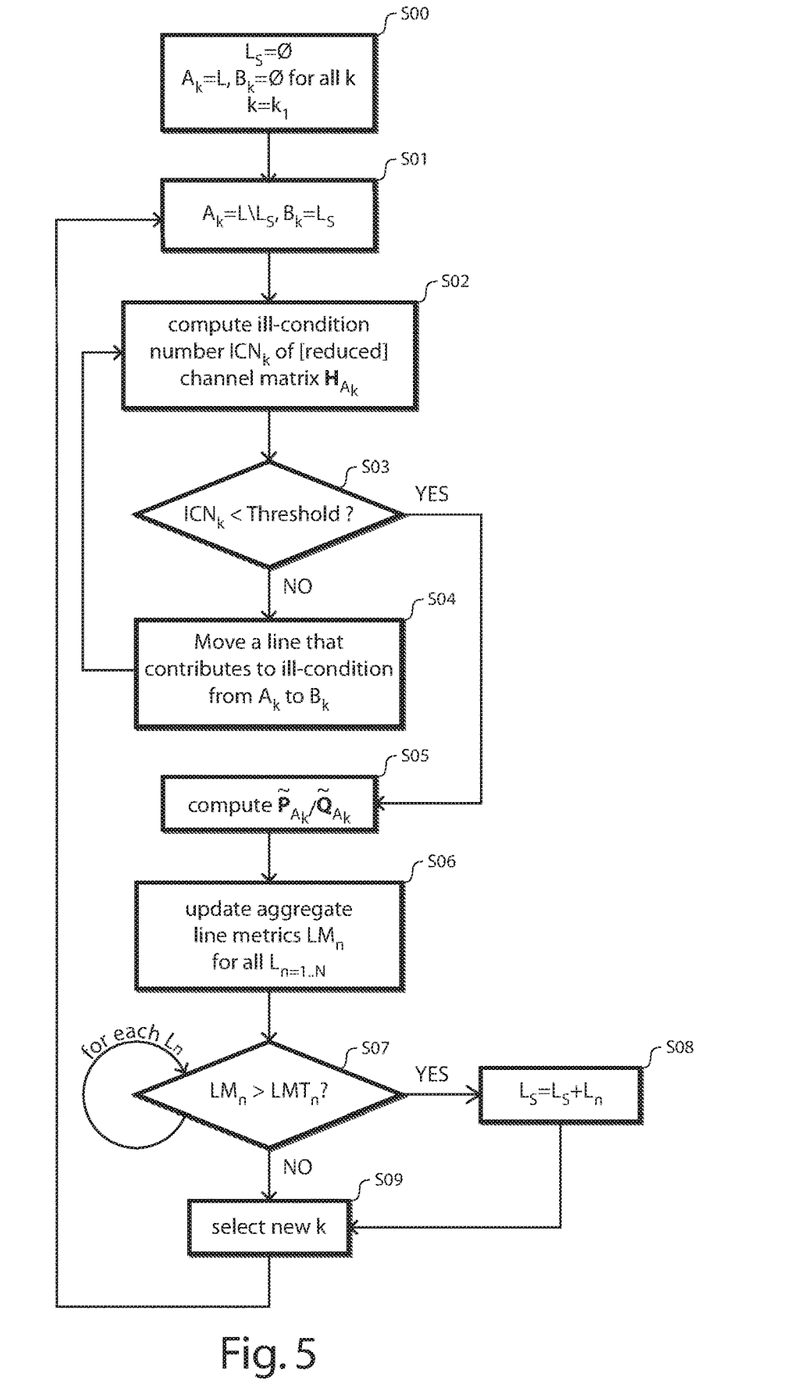
FIG. 5 represents a method flow chart for determining the sets of targeted and supporting lines for successive tones.

There is seen in FIG. 5 a flow chart for determining the sets of targeted and supporting lines for successive tones.

When moving lines from the targeted set $A_k$ to the supporting set $B_k$ on a given tone, the overall data rates of the remaining targeted lines $A_k$ are increased at the expense of the supporting lines $B_k$. By choosing different subsets on different tones, advantageous trade-offs can be made between lines to optimize desired objectives. For example, one objective may be to ensure that all lines achieve specified target rates.

Here, the goal is to adapt the targeted set to steer the line data rates towards the specified target data rates. These target rates can be a common minimum target data rate for all lines, or they can differ from each other in case particular lines get boosted target data rates for premium service.

At step S00, the set of satisfied lines $L_s$ is initialized to the empty set ($L_s=\emptyset$). For all tones k, the set of targeted lines $A_k$ is initialized to the set L (i.e., all vectored lines), and the set of supporting lines $B_k$ is initialized to the empty set (i.e., $M_k=0$). A first tone index $k=k_1$ is selected, and the method starts.

At step S01, the set of targeted lines $A_k$ is updated to the set $L\setminus L_s$ (i.e., the lines that have not yet satisfied their target rates), and the set of supporting lines $B_k$ is initialized to the set $L_s$.

At next step S02, the VCU 130 computes a condition number $ICN_k$ for the reduced channel matrix $H_{Ak}$.

At step S03, the VCU 130 determines whether the [reduced] channel matrix $H_{Ak}$ is ill-conditioned by comparing the condition number $ICN_k$ versus some threshold.

If the condition number $ICN_k$ is greater than the threshold, then the [reduced] channel matrix $H_{Ak}$ is expected to be ill-conditioned, and one or more subscriber lines should be removed from the targeted set $A_k$ for that tone. Consequently, at step S04, a line is selected and moved from the set of targeted lines $A_k$ to the set of supporting lines $B_k$, and the VCU 130 re-iterates through the steps S02 and S03 till the [reduced] channel matrix $H_{Ak}$ is no longer ill-conditioned. This procedure is guaranteed to stop before $A_k$ is empty, because a reduced channel matrix consisting of a single row or column is always well-conditioned.

When the condition number $ICN_k$ is lower than the given threshold, then the [reduced] channel matrix $H_{Ak}$ is not or is no-longer ill-conditioned, and no or no more lines need to be removed from the targeted set $A_k$.

The VCU 130 goes to next step S05, and configures a new rectangular vectoring matrix $\tilde{P}_{Ak}$ or $\tilde{Q}_{Ak}$ as per the present invention.

At step S06, the VCU 130 updates respective line metrics $LM_n$ for all lines $L_1$ to $L_N$ based on the configured set of targeted lines $A_k$ and set of supporting lines $B_k$, and on the configured vectoring matrix $\tilde{P}_{Ak}$ or $\tilde{Q}_{Ak}$. The line metric may refer for instance to an aggregate achievable data rate or an aggregate transmit power across all the tones that have been configured so far.

For the computation of the aggregate achievable data rates, an estimation of the achievable bit loadings for the respective tones needs to be carried out. This estimation can be based on actual error measurements at the receivers after the new vectoring matrix $\tilde{P}_{Ak}$ or $\tilde{Q}_{Ak}$ has been enforced, or can be based on an estimation of the data signal gains based on the configured vectoring matrix and an estimate of the channel matrix H. The bit loading computation is typically based on the Shannon capacity formula, and includes a given SNR gap to account for the particular coding and modulation schemes being used, and possibly a given SNR margin to absorb noise fluctuations if any.

At step S07, each of the updated line metrics is tested against a respective target metric. If a current line metric $LM_n$ for a particular line $L_n$ is greater than a respective target metric $LMT_n$ to be achieved over that line, then at step S08 the line $L_n$ is added to the set of satisfied lines $L_s$. This means that $L_n$ will be pre-assigned to the set of supporting lines $B_k$ for subsequent k, thereby giving precedence to the lines that did not yet achieve their respective target metric for the next tone iterations.

If the respective target metrics are met over all the lines $L_1$ to $L_N$, then this pre-assignment is no longer necessary, and the set $L_s$ can be re-initialized to the empty set.

Last, at step S09, a new tone index k is selected, and one re-iterates from step S01 onwards with the new selected tone index k till all tones have been processed. The tones can be processed in a deterministic order, such as increasing or decreasing tone index, or can be processed in a random or pseudo-random order.

The targeted set and the supporting set may be reinitialized occasionally (e.g., every $200^{th}$ tone), for instance in order to prevent a line that contributes to the ill-conditioning on a given tone from being removed for all subsequent tones.

Figure 6C:
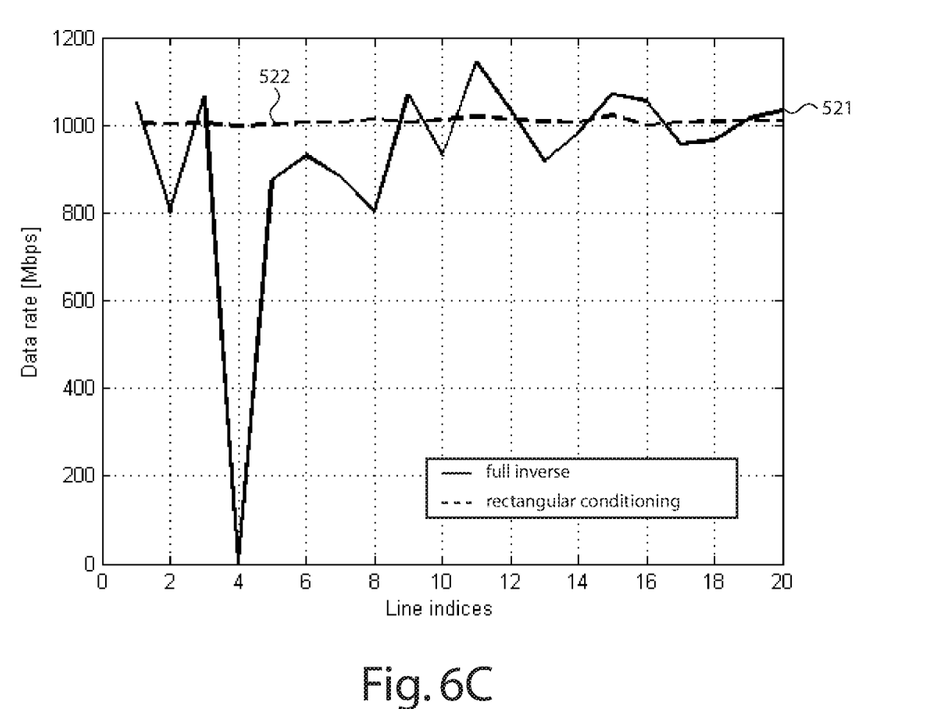

FIG. 6c represents a plot of the data rates achieved over respective ones of a group of vectored lines. Line 4 is a line with a bad contact, causing low direct gain and high crosstalk. Plot 521 corresponds to precoding with full channel inverse when all lines are targeted. In this case line 4 obtains a very low data rate. Plot 522 corresponds to the proposed method with target rates configured at 1 Gbps for all lines. It can be seen that the proposed scheme achieves the target rate for all lines, including the line with the bad contact.

In an alternative embodiment, the VCU 130 does not wait for a metric target to be met before pre-assigning a line to the set of supporting lines for subsequent tone iterations. Instead, the aggregate data rates are tracked through the successive tone iterations, and if some lines are allocated much more data rates than others, then they are removed from the set of targeted lines for one or more subsequent tone iterations till the data rates are again appropriately balanced.

For instance, the lines can be sorted according to their respective data rates, and the ratio or difference between the maximum and minimum data rates can be computed and compared to some given threshold for deciding whether the line with the maximum data rate shall be pre-assigned to the set of supporting lines for one or more subsequent tone iterations.

This embodiment is further advantageous in that data rate are continuously rebalanced while iterating through the steps of the method.

Once a given line achieves its metric target, then the first algorithm may kick in and that line may be pre-assigned to the set of supporting lines for subsequent tone iterations.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital signal Processor (DSP) hardware, network processor, Application Specific Integrated Circuit (ASIC), Field Programmable Gate Array (FPGA), etc. other hardware, conventional and/or custom, such as Read only Memory (ROM), Random Access Memory (RAM), and non volatile storage, may also be included.

The invention claimed is:

1. A vectoring controller configured to, for given ones of a plurality of tones:
    characterize a N×N channel matrix, comprising far-end coupling coefficients between a plurality of N subscriber lines at the given tone, as being ill-conditioned;
    determine a first set of N−Mk targeted lines and a second disjoint set of Mk supporting lines out of the plurality of N subscriber lines such that a (N−Mk)×N reduced channel matrix, comprising a far-end coupling tone coefficients from the plurality of N subscriber lines into the first set of N−Mk targeted lines at the given tone, is well-conditioned, Mk denoting a non-null positive integer;
    enable the given tone for direct data communication over the first set of N−Mk targeted lines, and disable the given tone for direct data communication over the second set of Mk supporting lines;
    configure a vectoring matrix to use an available transmit power at the given tone over the second set of Mk supporting lines to enhance data signal gains at the given tone over the first set of N−Mk targeted lines; and
    jointly process discrete multi-tone (DMT) communication signals to be transmitted over the plurality of N subscriber lines according to the vectoring matrix.

2. A vectoring controller according to claim 1, wherein the vectoring controller is further configured to balance at least one line metric across the plurality of N subscriber lines when iterating through the plurality of tones in sequence.

3. A vectoring controller according to claim 1, wherein the configured vectoring matrix is a rectangular N×(N−Mk) precoding matrix with at least one non-null off-diagonal precoding coefficient for the respective Mk matrix rows corresponding to the second set of Mk supporting lines.

4. A vectoring controller according to claim 3, wherein the configured rectangular vectoring matrix is a generalized inverse matrix of a (N−Mk)×N reduced channel matrix.

5. A vectoring controller according to claim 4, wherein the generalized inverse matrix is a Moore-Penrose pseudo-inverse of the (N−Mk)×N reduced channel matrix.

6. A vectoring controller according to claim 1, wherein
    the vectoring controller is further configured to iterate through the plurality of tones in sequence, and
    to update respective line metrics achieved over the plurality of N subscriber lines given the enabling and disabling of the tones and the configured vectoring matrices in each tone iteration, and to determine the first and second sets of lines based on the updated line metrics.

7. A vectoring controller according to claim 6, wherein the vectoring controller is further configured to assign at least one subscriber line of the plurality of N subscriber lines, whose updated line metric exceeds a given line metric target, to the second set of Mk supporting lines for at least one subsequent tone iteration.

8. A vectoring controller according to claim 6, wherein the vectoring controller is further configured to assign at least one subscriber line of the plurality of N subscriber lines, whose updated line metric exceeds by a given margin at least one updated line metric of at least one further subscriber line of the plurality of N subscriber lines, to the second set of Mk supporting lines for at least one subsequent tone iteration.

9. A vectoring controller according to claim 6, wherein the line metrics are data rates.

10. An access node configured to provide broadband communication services to subscribers, and comprising a vectoring controller according to claim 1.

11. A vectoring controller configured to, for given ones of a plurality of tones:
    characterize a N×N channel matrix, comprising far-end coupling coefficients between a plurality of N subscriber lines at the given tone, as being ill-conditioned;
    determine a first set of N−Mk targeted lines and a second disjoint set of Mk supporting lines out of the plurality of N subscriber lines such that a (N−Mk)×N reduced channel matrix, comprising a far-end coupling tone coefficients from the plurality of N subscriber lines into the first set of N−Mk targeted lines at the given tone, is well-conditioned, Mk denoting a non-null positive integer;
    enable the given tone for direct data communication over the first set of N−Mk targeted lines, and disable the given tone for direct data communication over the second set of Mk supporting lines;
    configure a vectoring matrix to use an available receive power at the given tone over the second set of Mk supporting lines to enhance data signal gains over the given tone at the first set of N−Mk targeted lines; and
    jointly process discrete multi-tone (DMT) communication signals to be received over the plurality of N subscriber lines according to the vectoring matrix.

12. A vectoring controller according to claim 11, wherein the configured vectoring matrix is a rectangular (N−Mk)×N postcoding matrix with at least one non-null off-diagonal postcoding coefficient for a respective Mk matrix columns corresponding to the second set of Mk supporting lines.

13. A vectoring controller according to claim 12, wherein the configured rectangular vectoring matrix is a generalized inverse matrix of a N×(N−Mk) reduced channel matrix.

14. A vectoring controller according to claim 13, wherein the generalized inverse matrix is a Moore-Penrose pseudo-inverse of the N×(N−Mk) reduced channel matrix.

15. A vectoring controller according to claim 11, wherein the vectoring controller is further configured to balance at least one line metric across the plurality of N subscriber lines when iterating through the plurality of tones in sequence.

16. A vectoring controller according to claim 11, wherein the vectoring controller is further configured to iterate through the plurality of tones in sequence, and to update respective line metrics achieved over the plurality of N subscriber lines given the enabling and disabling tones and the configured vectoring matrices in each tone iteration, and to determine the first and second sets of lines based on the updated line metrics.

17. A vectoring controller according to claim 16, wherein the vectoring controller is further configured to assign at least one subscriber line of the plurality of N subscriber lines, whose updated line metric exceeds a given line metric target, to the second set of Mk supporting lines for at least one subsequent tone iteration.

18. A vectoring controller according to claim 16, wherein the vectoring controller is further configured to assign at least one subscriber line of the plurality of N subscriber lines, whose updated line metric exceeds by a given margin at least one updated line metric of at least one further subscriber line of the plurality of N subscriber lines, to the second set of Mk supporting lines for at least one subsequent tone iteration.

19. A vectoring controller according to claim 16, wherein the line metrics are data rates.

20. An access node configured to provide broadband communication services to subscribers, and comprising a vectoring controller according to claim 11.

21. A method for configuring a vectoring processor comprising, for given ones of a plurality of tones:
 characterizing a N×N channel matrix, comprising far-end coupling coefficients between a plurality of N subscriber lines at a given tone, as being ill-conditioned;
 determining a first set of N−Mk targeted lines and a second disjoint set of Mk supporting lines out of the plurality of N subscriber lines such that a (N−Mk)×N reduced channel matrix, comprising a far-end coupling tone coefficients from the plurality of N subscriber lines into the first set of N−Mk targeted lines at the given tone, is well-conditioned, Mk denoting a non-null positive integer;
 enabling the given tone for direct data communication over the first set of N−Mk targeted lines, and disabling the given tone for direct data communication over the second set of Mk supporting lines;
 configuring a vectoring matrix to use an available transmit power at the given tone over the second set of Mk supporting lines to enhance data signal gains at the given tone over the first set of N−Mk targeted lines; and
 jointly processing discrete multi-tone (DMT) communication signals to be transmitted over the plurality of N subscriber lines according to the vectoring matrix.

22. A method for configuring a vectoring processor comprising, for given ones of a plurality of tones:
 characterizing a N×N channel matrix, comprising far-end coupling coefficients between a plurality of N subscriber lines at a given tone, as being ill-conditioned;
 determining a first set of N−Mk targeted lines and a second disjoint set of Mk supporting lines out of the plurality of N subscriber lines such that a (N−Mk)×N reduced channel matrix, comprising a far-end coupling tone coefficients from the plurality of N subscriber lines into the first set of N−Mk targeted lines at the given tone, is well-conditioned, Mk denoting a non-null positive integer;
 enabling the given tone for direct data communication over the first set of N−Mk targeted lines, and disabling the given tone for direct data communication over the second set of Mk supporting lines;
 configuring a vectoring matrix to use an available receive power at the given tone over the second set of Mk supporting lines to enhance data signal gains over the given tone at the first set of N−Mk targeted lines; and
 jointly processing discrete multi-tone (DMT) communication signals to be received over the plurality of N subscriber lines according to the vectoring matrix.

* * * * *